United States Patent Office 3,342,822
Patented Sept. 19, 1967

3,342,822
1,4-BIS(p-CYANO(AND NITRO)-PHENOXY-
ETHYL)-PIPERAZINES
Ansel Parrish Swain, Wyndmoor, Cornelius Kennady
Cain, Flourtown, and Adolph Peter Roszkowski, Willow Grove, Pa., assignors to McNeil Laboratories, Inc.,
a corporation of Pennsylvania
No Drawing. Filed June 9, 1966, Ser. No. 556,278
5 Claims. (Cl. 260—268)

This invention relates to novel chemical compounds having useful pharmacological properties and applications in view of their anorectic activity. More particularly, the invention relates to certain bis-substituted piperazines and the therapeutically active acid addition salts thereof. Said bis-substituted piperazines are denoted as 1,4-bis(p-nitrophenoxyethyl)piperazine (I) and 1,4-bis(p-cyanophenoxyethyl)piperazine (II), and may be structurally represented as follows:

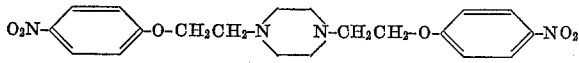

(I)

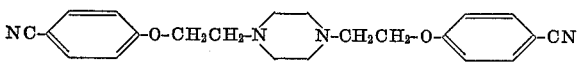

(II)

The subject compounds may be prepared by the reaction of piperazine with p-nitro-phenoxyethylhalide and p-cyano-phenoxyethoxyhalide, respectively, the preferred halide being the bromide. Alternatively, they may be obtained by the reaction of 1,4-bis-hydroxyethyl-piperazine with p-nitro-halobenzene and p-cyano-halobenzene, respectively, the preferred halo being bromo. The presence of a halogen acid acceptor, e.g., sodium or potassium carbonate, an alkali metal hydroxide or hydride, and the like, may be advantageously employed to bind the halogen acid (e.g., hydrogen bromide) that is liberated during the course of the reaction. Suitable solvents include dimethylformamide, aromatic hydrocarbons such as benzene, toluene, xylene and the like, and lower alkanols and alkanones. Elevated temperatures may be advantageously employed.

Depending upon the conditions employed during the course of the reaction, the novel compounds of this invention are obtained either in the form of the free bases or salts thereof. The salts are converted to the free bases in the usual manner, e.g., by reaction with alkali such as sodium or potassium hydroxide. The compounds in base form may be converted to their therapeutically useful acid addition salts by reaction with an appropriate acid, for example, an inorganic acid such as a hydrohalic acid, i.e., hydrochloric, hydrobromic or hydriodic acid, sulfuric, phosphoric and the like acids; an organic acid such as acetic, lactic, maleic, malonic, fumaric, tartaric, benzoic and the like acids.

The following examples are intended to illustrate, but not to limit, the scope of the present invention.

EXAMPLE I

A solution of 32 g. (0.14 mole) of p-cyano-phenoxyethylbromide in 25 ml. of dimethylformamide is added to a mixture of 6 g. (0.07 mole) of piperazine and 6.7 g. (0.14 mole) of sodium hydride (50% suspension in mineral oil) in 50 ml. of dimethylformamide. The mixture is stirred for 3 hours and then heated on a steam bath for an additional 15 minutes. Water is added to precipitate the free base, 1,4-bis(p-cyanophenoxyethyl)piperazine, which is then filtered off. The base is dissolved in methanol and concentrated hydrochloric acid is added. The resulting precipitate, 1,4-bis(p-cyanophenoxyethyl)piperazine dihydrochloride is filtered off and recrystallized from hot aqueous methanol to give the dihydrochloride, M.P. 270–280° C. (dec.).

EXAMPLE II

A mixture of 53 g. (0.215 mole) of p-nitro-phenoxyethylbromide, 9.2 g. (0.107 mole) of piperazine and 35 g. (0.43 mole) of sodium hydroxide in 40 ml. of water is stirred and refluxed for eight hours. An equal volume of water is added to the reaction mixture and the resulting solid product, 1,4-bis(p-nitrophenoxyethyl)piperazine, is filtered off. The base is converted to the dihydrochloride salt by suspending the product in 400 ml. of hot methanol and adding an excess of concentrated hydrochloric acid. The mixture is cooled and the resulting salt, 1,4-bis(p-nitro-phenoxyethyl)piperazine dihydrochloride, is filtered off, M.P. 250–255° C. (dec.).

The free base, 1,4-bis(p-nitrophenoxyethyl)piperazine, is obtained by shaking the corresponding dihydrochloride salt with equal volumes of dilute aqueous sodium hydroxide and methylene chloride. The methylene chloride layer is separated and the organic solvent evaporated in vacuo. The residue is dissolved in a hot solution of 50 g. of tartaric acid in one liter of water. On cooling, the precipitate is filtered off and washed successively with water and acetone to give the salt, 1,4-bis(p-nitrophenoxyethyl)piperazine ditartrate hydrate, M.P. 165–167° C.

EXAMPLE III

A mixture of 8.7 g. (0.05 mole) of bis-hydroxyethylpiperazine, 4.8 g. (0.1 mole) of sodium hydride in a 50% mineral oil suspension and 75 ml. of dimethylformamide is heated on a steam bath for about 30 minutes. To this is added 20.2 g. (0.1 mole) of p-bromonitro-benzene and heating is continued for about 24 hours. The mixture is cooled and 50 ml. of water is added cautiously. The resulting precipitate, 1,4-bis(p-nitrophenoxyethyl)piperazine, is filtered off and converted to the dihydrochloride as previously described.

What is claimed is:

1. A member selected from the group consisting of 1,4-bis(p-cyanophenoxyethyl)piperazine and the therapeutically active acid addition salts thereof.

2. A member selected from the group consisting of 1,4-bis(p-nitrophenoxyethyl)piperazine and the therapeutically active acid addition salts thereof.

3. 1,4-bis(p-cyanophenoxyethyl)piperazine dihydrochloride.

4. 1,4-bis(p-nitrophenoxyethyl)piperazine dihydrochloride.

5. 1,4-bis(p-nitrophenoxyethyl)piperazine ditartrate hydrate.

References Cited

Ashley et al., J. Chem. Soc., London (1959), pages 3880–3882 and 3894.

HENRY R. JILES, Primary Examiner.

R. BOYD, Assistant Examiner.